3,157,620
SOLVENT SOLUBLE BAKING TYPE RESINS
Benjamin A. Bolton, Gary, Ind., assignor to Standard Oil Company, Chicago, Ill., a corporation of Indiana
No Drawing. Original application Mar. 17, 1960, Ser. No. 15,550, now Patent No. 3,067,158, dated Dec. 4, 1962. Divided and this application Aug. 9, 1961, Ser. No. 130,262
5 Claims. (Cl. 260—76)

This invention relates to polyester resins characterized by thermosetting properties and suitable for producing baked finish surface coatings.

Good quality thermosetting resins, both organic soluble and water soluble forms, made from benzene tricarboxylic acid, aliphatic dicarboxylic acid and aliphatic polyol are now available. Baked surface coatings from these resins are somewhat deficient in resistance to aqueous alkali metal hydroxide solutions. The primary object of this invention is a resin composition of the above type which possesses better alkali solution resistance. Other objects will become apparent in the course of the detailed description of the invention.

The composition of the invention takes two separate forms, namely, (1) a composition wherein the resin portion is soluble in oxygenated organic solvents and (2) a composition wherein the resinous portion is soluble in water. The resin consists of the polyester condensation reaction product of a benzene tricarboxylic acid or anhydride and of aliphatic dicarboxylic acid containing at least 4 carbon atoms and an aliphatic polyol modified with a benzoic acid to have only two unreacted hydroxyl groups. The water soluble resinous product consists of the polyester condensation reaction product resin reacted with an alkaline substance to obtain water solubility.

The hereinafter defined resin and water soluble resinous product component of the composition of the invention is characterized by the ability to form a thermoset solid upon air-baking at a temperature on the order of 400° F.

Resin

The resin polyester condensation reaction product is prepared by condensing an aliphatic polyol-benzoic acid ester containing two free-hydroxyl groups, an aliphatic dicarboxylic acid containing at least 4 carbon atoms, and a benzene tricarboxylic acid at elevated temperatures, for example, about 300°–400° F., while continuously removing the water formed in the reaction. The polyester condensation reaction is well known and it is not necessary to describe it in detail herein.

The benzene tricarboxylic acids and anhydrides may also be described as acidic members selected from the class consisting of benzene tricarboxylic acids containing, as the only substituents, 3 carboxyl groups and anhydrides thereof. The indvidual members of the defined class are trimellitic acid, trimellitic anhydride, trimesic acid, hemimellitic acid and hemimellitic anhydride. Trimellitic anhydride is the preferred acidic member.

The reaction requires the presence of an aliphatic polyol-benzoic acid ester containing two hydroxyl groups. Any of the well-known aliphatic polyols containing at least three hydroxyl groups may be used such as glycerol, tetrahydroxy alcohols, and hexahydroxy alcohols. Examples of suitable aliphatic polyols are glycerol, trimethylol-propane, erythritol, pentaerythritol, dispentaerythritol, mannitol, and sorbitol.

The ester is formed by reaction of the defined polyol and benzoic acid. The benzoic acid may be benzoic acid itself. The benzoic acid may contain alkyl substituents such as methyl, ethyl, etc. A particularly suitable acid is p-tert-butylbenzoic acid. Other substituents such as chloro groups may be present. It is preferred to utilize either benzoic acid itself or a benzoic acid containing an alkyl substituents having from 1–4 carbon atoms.

Sufficient benzoic acid is utilized to react with hydroxyl groups present in the polyol in excess of two free-hydroxyl groups. It is preferred that the ester be preformed.

The reaction requires the presence of an aliphatic dicarboxylic acid containing at least 4 carbon atoms. Examples of suitable acids are succinic, glutaric, adipic, suberic, sebacic, maleic, itaconic, 1,6-hexane-3-dioic, linoleic-dimer, hexadecanedioic, eicosanedioic, hexacosanodioic and tetratriacontanedioic. The alkandioic acids containing from 4 to about 20 carbon atoms are preferred.

In addition to the defined benzene tribasic acids, the defined aliphatic dicarboxylic acids and the defined ester, the resin polyester condensation reaction product may include an aliphatic mono-hydroxy alcohol. The aliphatic monohydroxy alcohols include, by way of example, methyl alcohol, butyl alcohol, hexyl alcohol, stearyl alcohol, allyl alcohol, and oleyl alcohol. In addition to the individual compound, mixtures of these monohydroxy alcohols may be used, e.g., the mixtures obtained from the oxoation of a mixture of olefins. Such mixtures of oxo alcohols are now available commercially and are known as isooctyl alcohol, nonyl alcohol, isodecyl alcohol, and tridecyl alcohol.

The resin polyester condensation reaction product may be obtained by using individual benzene acids or anhydrides, individual aliphatic dicarboxylic acids or individual esters (and individual monohydroxy alcohols) or a mixture of benzene acids, or acids or esters (or monohydroxy alcohols).

The characteristics of the resin polyester condensation reaction product is dependent upon the type of reactants, and upon the mole ratios existing among the reactants. In general, the mole ratio of the defined benzene acid to the defined dicarboxylic acid to defined ester is from about 1:1:2 to 10:1:25. Ratios of reactants outside the spelled out range may be utilized for production of resins having special properties. More usually, the mole ratio of defined benzene acid to defined dicarboxylic acid is between about 2 and 5. The preferred charge to the polyester condensation zone is calculated on the basis of about 2 moles of ester per mole of defined benzene acid and about 1 mole of alcohol per mole of defined dicarboxylic acid. At the same ratio of reactants, the surface coatings obtainable from the resins may not be of essentially identical characteristics for different reaction systems.

When a monohydroxy alcohol is also present, it is desirable to have a mole ratio of defined ester to monohydroxy alcohol between 1 and 10. It is to be understood that the amount of monohydroxy alcohol may be less than this amount or more than this amount, dependent upon the desired characteristics of the final product.

The polyester condensation reaction product desirably is prepared under conditions of reaction such that the resin has an acid number the lowest possible commensurate with avoiding gelation. In general, the acid number of the polyester product will be between about 20 and 100. (It is to be understood that not all combinations of the defined reactants can produce an acid number as low as 20, however.)

The resin polyester condensation reaction products range from very viscous liquids to hard solids in appearance. These polyester products possess the common characteristic of forming "rigid" solids when baked at temperatures on the order of 400° F. in the presence of oxygen or air. The degree of baking (curing) needed to obtain a thermoset material will depend upon the particular polyester product. In general, these products form thermoset materials at 400° F. in times ranging from 15 minutes to 1 hour. These polyester resins will cure to thermoset materials at lower temperatures, but require much longer times. An outstanding characteristic of the thermoset solids derived from the polyester products of the invention is the excellent color present in the thermoset solid. Unlike the majority of the presently available commercial materials which form rigid thermoset solids, the color of the polyester product is not significantly degraded by this severe curing at about 400° F. Another outstanding characteristic of the thermoset solids is the glossy surface appearance.

The resin compositions of the invention have utility in the broad field of rigid plastics now occupied by materials such as phenol formaldehyde resins and filled melamine-formaldehyde resins. They may also be used as binders for laminations such as plywood forming and fiber glass reinforced plastics. In both of these uses, the compositions of the invention are particularly good because no curing agent need be added in order to obtain good rigidity or suitably short curing time.

The resin compositions are excellent film-formers when dissolved in oxygenated organic solvents for use in the formation of baked surface coatings. The compositions in solvent solution may have pigments introduced therein, in order to produce enamel finishes which possess high gloss.

The resin polyester products are soluble in the oxygenated organic solvents commonly used in the surface coating field. The better known of these solvents are alcohols such as methyl and butyl, and ketones such as acetone and methylethylketone. Also, these materials may be dissolved in the commonly used mixtures of benzene hydrocarbons such as toluene and xylene with an oxygenated organic solvent; a typical mixed solvent consists of 60:40 volume ratio of mixed xylenes and butanol.

The polyester condensation reaction is carried out in normal fashion. However, the nature of some of the reactants makes it preferable to modify the start-up procedure. It is preferred to have in the reaction zone at least one liquid reactant; the liquid reactant may be naturally liquid or liquid at the temperature of the polyester condensation reaction. In the case of a normally liquid reactant, all the reactants are charged into the reaction zone and all reactants brought to the reaction temperature simultaneously. Where all the reactants are normally solid, it is preferred to add the lowest melting reactant to the reaction zone first and produce a liquid material by raising the temperature to the melting point; then the other reactants are introduced and the whole brought to the desired reaction temperature. Also, the reactants may be added in order of melting point in sequence in order to have the material in the reaction zone substantially liquid at all times. It is to be understood that, regardless of the method of addition of the reactants, all of the reactants are, for practical purposes, simultaneously present throughout the reaction (cooking) time.

Water Soluble Resin Product

The water soluble resin consists essentially of the resin produced by the reaction of the polyester condensation reaction product and an alkaline reacting material. The resin and the alkaline material are reacted until a water soluble resin is obtained. The amount of alkaline reacting material is most readily determined by following the pH of the reaction medium. An aqueous reaction medium is preferred when the water soluble resin is to be used for surface coating applications because the desired water solution is obtained immediately. When the resin and aqueous reaction medium are contacted in the presence of an alkaline reacting material, the resin passes into solution substantially completely at a pH of about 5. In practically all instances, the resin will be in complete solution at a pH of about 6. The use of alkaline reacting material in excess of that needed to bring all the polyester product into solution is not harmful, at least up to a water solution pH of about 8. It is preferred to have the aqueous solution somewhat on the acid side or neutral, i.e., a pH of from 6 to 7.

The alkaline reacting material may be any material which reacts with acidity to produce a more neutral product. Ammonia (as the hydroxide) and alkali metal hydroxides are particularly suitable when aqueous reaction medium is desired. The hydrocarbon amines, particularly the lower molecular weight containing not more than 4 carbon atoms in each aliphatic group, are suitable. The amine aliphatic alcohols, such as ethanolamines, are especially suitable. The heteroamines, such as morpholine, pyridine, and piperidine may be used. The type of alkaline reacting material used is determined in part by the characteristics desired in the final water soluble resin; also, by the type of resin product which is to be converted to a water soluble form. Preferred materials are aqueous ammonia, the lower molecular weight alkyl amines, such as ethylamines and butylamines and morpholine, and the alkanolamines, such as monoethanolamine.

The neutralization reaction is carried out by contacting the resin and the alkaline reacting medium, when necessary in the presence of a liquid reaction medium; particularly suitable reaction mediums are oxygenated organic solvents and water. When water is used as the liquid reaction medium, it is preferred that it be warm, i.e., maintained in the region of 100–160° F.; the resin is added to the aqueous alkaline reacting material and the two agitated until the resin has passed into solution. Ammonium hydroxide solution is a particularly suitable aqueous alkaline medium. The water solutions of the water soluble resin are clear liquids usually containing some opalescent appearance; the solutions may be colorless or colored, depending on the particular water soluble resin present.

The water soluble resin behaves in essentially the same manner as the resin when exposed to oxygen or air at elevated temperatures in that an air-baked or cured thermoset solid is formed. At temperatures on the order of 400° F., the water soluble resin produces hard films on metal surfaces in times of 15 minutes to 1 hour. An outstanding characteristic of the products is that the water soluble resins possess essentially the identical thermosetting properties that the water insoluble polyester resin progenitors possess. Surprisingly, the films produced from the water solutions possess the same very high gloss that the films produced from the solvent solutions of polyester products possesses; this gloss is particularly apparent in the presence of pigments where enamel finishes are obtained.

These water soluble resins produce solutions containing as much or more than 50 percent by weight of the resin. The water soluble resins are also soluble in the ordinary oxygenated organic solvents, as well as in mixtures of these solvents with benzene hydrocarbons. Because of cheapness and safety, water is the preferred solution for surface coating applications; and also as reaction medium.

The water soluble composition may be recovered from the reaction medium and used for the preparation of thermoset solids in the same applications as the resin composition may be used. For surface coating purposes, the solid water soluble compositions is preferably dissolved in a sufficient amount of water to produce the desired viscosity for the particular application.

Preparation

A resin was prepared from trimellitic anhydride, adipic acid, and glycol (or ester) in a ratio of 3:1:7. The reactants were raised to 352° F. and cooked for a period of 7 hours with a sparge of nitrogen gas; a total of 103 ml. of water was condensed during this time. The polyester resin product was a clear, yellowish solid. The solid resin was dissolved in a 60:40 (by volume) mixture of xylene and butanol to obtain a 50% solution i.e., 1 part by weight of resin for 1 part by weight of solvent. The solution had a Gardner viscosity of L and a Gardner color of 2. This resin was converted to the water soluble form by treatment with ammonium hydroxide to obtain a solution having a pH of about 6.

A white enamel was prepared by adding titanium dioxide to a water solution of the above resin. This white enamel was applied to tin-plated panels by a procedure providing an ultimate film thickness of 0.9 mil.

Three resins were prepared by the above procedure utilizing as the polyol propylene glycol, 1,3-butanediol and neopentyl glycol respectively. Another resin was prepared utilizing as the polyol the ester of benzoic acid and trimethylol ethane containing two free-hydroxyl groups.

Each panel was subjected to the standard test for baked surface coatings, namely, flexibility as determined by bending around a ⅛" diameter rod; the inch-lbs. of impact tolerable; the resistance to marring by metal pressure applied to the surface; and the resistance to a 2% solution of sodium hydroxide in water—the tendency to dull the glossy finish and in the longer times to strip the coating from the panels.

When baked at 400° F. for 30 minutes, the properties of the panels in all tests except the sodium hydroxide solution resistance test was essentially identical—in all cases excellent performance. The three resins utilizing unmodified glycols showed visible attack after four hours' exposure to the 2% sodium hydroxide solution. The panels prepared from the benzoic acid—trimethylol ethane containing resin showed no sign of attack after 16 hours of exposure to the 2% sodium hydroxide solution.

This is a division of my co-pending application Serial No. 15,550, filed March 17, 1960, now U.S. Patent No. 3,067,158.

Thus, having described the invention, what is claimed is:

1. A composition consisting essentially of the resin polyester condensation reaction product of (a) a benzene tricarboxylic acidic member selected from the group consisting of trimellitic acid, trimellitic anhydride, trimesic acid, hemimellitic acid, and hemimellitic anhydride, (b) aliphatic dicarboxylic acids containing a total of at least 4 carbon atoms, and (c) aliphatic polyol-benzoic acid ester containing two free-hydroxyl groups, wherein the mole ratio of acidic member:dicarboxylic acid:ester is between about 1:1:2 and about 10:1:25, which resin is characterized by solubility in oxygenated organic solvents and cures to a thermoset solid at a temperature of about 400° F.

2. The composition of claim 1 wherein said acidic member is trimellitic anhydride.

3. The composition of claim 1 wherein said acid is adipic acid.

4. The resin of claim 1 wherein said ester is formed from trimethylol propane and benzoic acid.

5. The resin of claim 1 wherein said ester is formed from glycerol and tert-butylbenzoic acid.

References Cited in the file of this patent

UNITED STATES PATENTS

| | | |
|---|---|---|
| 1,864,909 | Jaeger | June 28, 1932 |
| 1,950,468 | Zwilgmeyer | Mar. 13, 1934 |
| 2,960,485 | Bolton et al. | Nov. 15, 1960 |

FOREIGN PATENTS

| | | |
|---|---|---|
| 540,030 | Canada | Apr. 23, 1957 |
| 590,551 | Canada | Jan. 12, 1960 |

OTHER REFERENCES

"Trimellitic Anhydride," published by Amoco Chemicals, Chicago, Illinois, September 2, 1958, 32 pages.